May 14, 1957  R. O. DAVIS  2,792,257
LAWN SPRINKLER AND WASHER
Filed Dec. 28, 1954  2 Sheets-Sheet 1
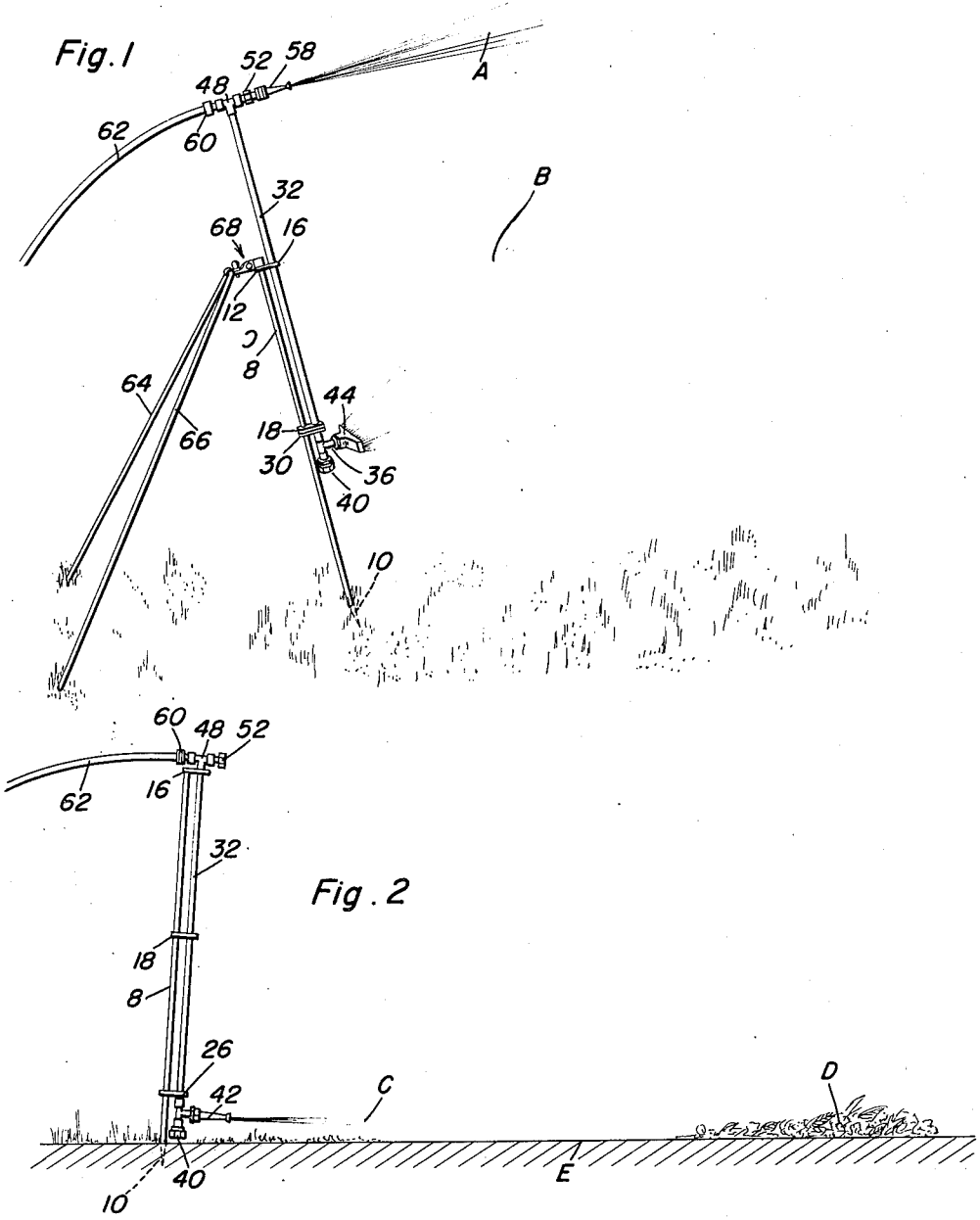
Raymond O. Davis
INVENTOR.

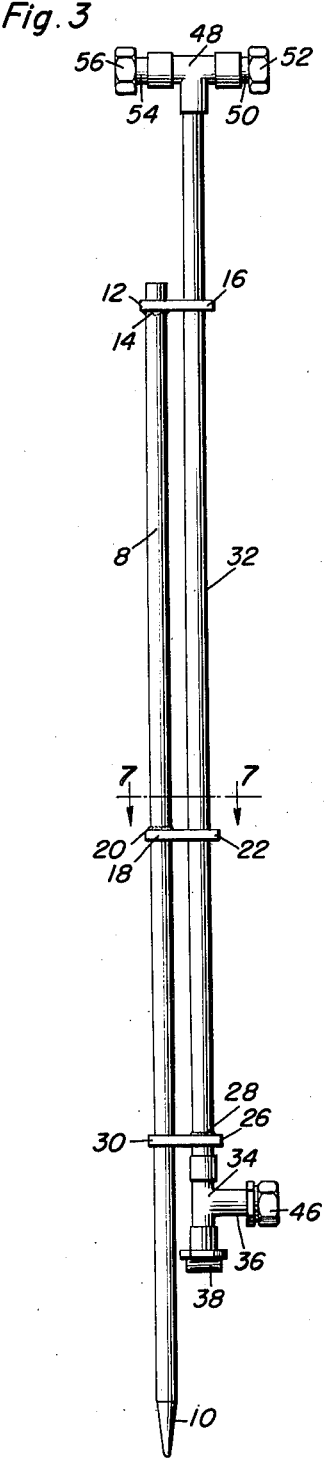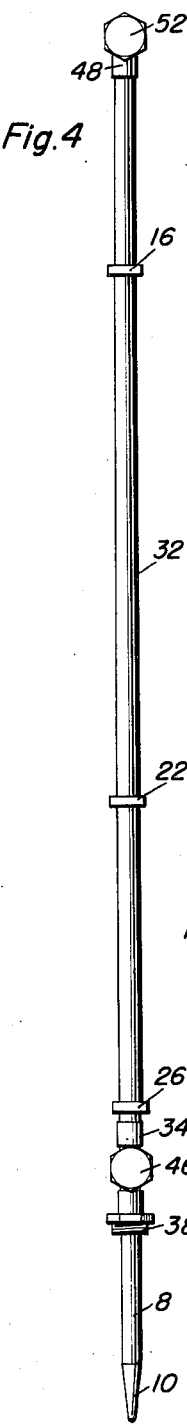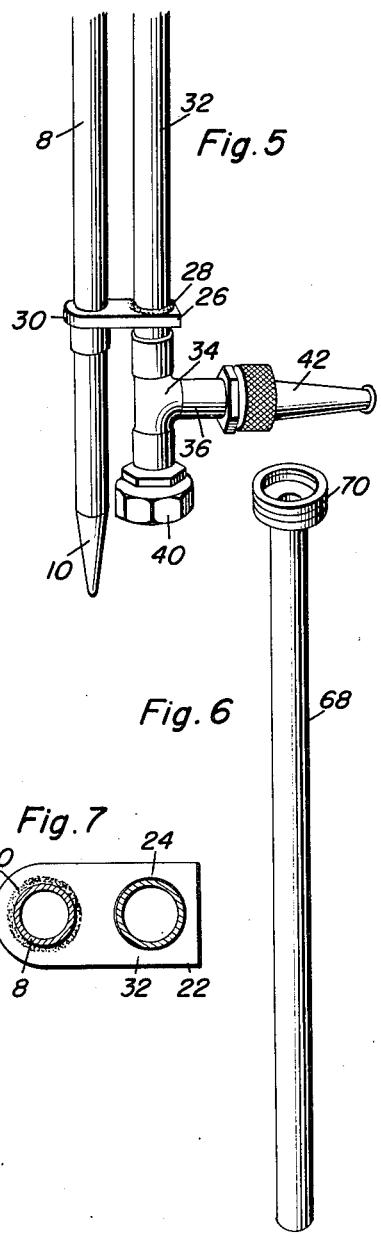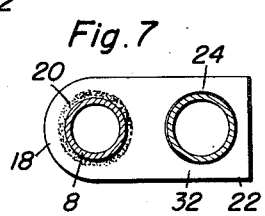
Raymond O. Davis
INVENTOR.

United States Patent Office 2,792,257
Patented May 14, 1957

2,792,257

LAWN SPRINKLER AND WASHER

Raymond O. Davis, Pacific Palisades, Calif.

Application December 28, 1954, Serial No. 478,071

1 Claim. (Cl. 299—73)

The present invention relates to household lawn and garden equipment, broadly and generally speaking, and has reference in particular to a novel structural multipurpose device with which a conventional-type garden hose may be communicatively and detachably connected and which is expressly designed and made to accomplish several jobs; namely, sprinkling the lawn, washing the surface by removing loose leaves and debris, and for boring holes in and around trees and shrubs to assist in fertilizing the latter.

As is clear from the preceding general statement of the subject matter of the invention, the preferred embodiment thereof is of a novel convertible type whereby upon making handy and slight adjustments of the complemental parts, the user may attend to and actually and effectually carry out any one or all of the several chores above mentioned.

In carrying out a preferred embodiment of the invention, an elongated ground stake is utilized, and this is preferably of a vertical height that it serves not only as a positioning and hose anchoring member, but as a handy staff which may be grasped and moved here and there by the user or other walking attendant, the same serving as a support for a vertically adjustable or extensible and retractible linearly straight pipe or equivalent conduit which may be straight up and down and thus raised and lowered for practical use when sprinkling the lawn or washing the lawn, whichever is necessary or desired.

More particularly construed, the stake or staff is provided with rigidly attached apertured brackets, and the water conducting pipe is slidable in the apertures of the brackets for raising and lowering. There is a T-coupling on the upper end to one end of which the garden hose is connected and to the other end of which the nozzle, the usual type, is connected. On the lower end, there is a communicating nozzle, and this may be used in conjunction with the first named nozzle when sprinkling requirements are being taken care of, or it may be shoved down close to the ground for lawn washing purposes, at which time the upper sprinkling or hose nozzle is removed.

In addition, novelty is predicated upon a lawn sprinkler with upper and lower nozzles on the vertically adjustable water conducting pipe, and the combination therewith of a pair of legs and clamp means which may be connected with the upper end of the staff so that the latter and legs combine in forming a triple legged tripod.

Novelty is predicated in addition upon the elongated staff having a pointed end functioning as a ground stake with cooperating brackets providing operating connections between the stake and the vertically adjustable water conducting pipe, the latter being provided at its lower end with a T-shaped fitting, one branch or portion of which may be capped and cut off or may be utilized to accommodate a hose nozzle, and the other of which is screw threaded to accommodate either a closing cap or an extension tube, the latter part being usable as a so-called boring implement by using the stream of water to "bore" a hole in the ground which hole is later used to receive fertilizer for trees, plants and flowers.

Other objects, features and advantages will become more readily apparent from the following description and the accompanying sheet of illustrative drawings.

In the drawings, wherein like numerals are employed to designate like parts throughout the views:

Figure 1 is a perspective view showing one form of the invention wherein the aforementioned tripod is employed and the device is used for upper and lower streams in spraying or sprinkling a lawn;

Figure 2 is a side elevational view with the tripod legs removed and with the staff staked in the ground and the hose nozzle removed and applied to the bottom where it is employed for lawn flushing and washing purposes;

Figure 3 is an elevational view on a larger scale with all nozzles removed and the T-coupling at the top capped and the T-coupling at the bottom with one cap and the other end open;

Figure 4 is an elevational view of the showing seen in Figure 3, looking in a direction from right to left;

Figure 5 is a further enlarged fragmentary perspective view with the closing cap at the bottom and the lawn flushing or washing nozzle in position for use;

Figure 6 is a perspective view of the extension tube which is a special boring nozzle and optionally and selectively used; and Figure 7 is an enlarged cross-section on the line 7—7 of Figure 3, looking in the direction of the arrows.

Referring now to the essential structural aspects of the invention seen in Figures 3 to 7 in particular, and with reference, for example, to Figure 3, the rigid linearly straight either hollow or solid member is denoted by the numeral 8. This is preferably treated here as a staff in that it is a sort of a long handle for moving the structure from place to place and staking it here and there for whatever purposes it is to be used. The lower end is pointed, as at 10, and thus this same member may be treated as an elongated stake. Preferably it is a staff with a ground penetrating end which may be staked in the ground. There is an upper lug or bracket 12 fixed by welding or the like, as at 14, and with a projecting end portion 16. There is a second complemental bracket 18 welded in place at 20 and having an extended apertured end 22. These apertured ends are shown best in Figure 7, and the aperture forms a guide and is denoted by the numeral 24. Both brackets 12 and 18 are identical. There is a similar and third bracket, and this one is denoted by the numeral 26 and it is welded at 28 and provided with an apertured end portion 30 which is slidably connected with the lower pointed end portion of the staff 8. This bracket 26 is carried by the linearly straight vertically elongated tube or pipe 32 sometimes treated as a water conducting conduit. The major portion of this is slidably mounted in the apertures 24 in the brackets 12 and 18. On the lower end, there is a T-coupling 34 having the end of its branch 36 screw threaded. There is also a screw threaded terminal at 38 on the other branch. This terminal 38 may serve to accommodate a screw cap, for example, the one denoted at 40 in Figure 5 when this end of the coupling is thus closed off. On the branch 36 may be applied either the nozzle 42 or a corresponding but high pressure nozzle 44, as shown, for instance, in Figure 1. If these nozzles are removed, the screw cap 46 may be substituted therefor, all depending on the manner in which the device is used.

There is another T-coupling 48 on the upper end, and on one nipple 50 of this, there is an attachable and detachable screw cap 52. On the other nipple 54, there is a hose coupling 56, as shown in Figure 3, for example.

By removing the screw cap 52, for example, the hose nozzle 58 may be substituted therefor to provide a stream A of water at an elevated point. The cap and connection 54 also serve to accommodate a coupling 60 on an ordinary garden hose 62 whenever the device is used in the manner shown in Figures 1 and 2.

The device is sometimes used merely for projecting upper and lower streams A and B for lawn sprinkling or spraying purposes. Often it is desired to place the sprinkler and to let it stay in position for some length of time, and when this is done, it is preferred that a tripod be provided. This is accomplished by providing a pair of hingedly connected legs 64 and 66 having clamping means 68 at the upper end detachably connected with the upper end portion of the staff 8 in the manner shown, for example, in Figure 1. Here, we see the water pipe 32 elevated and both nozzles 58 and 44 elevated. The lower end 38 is closed by way of the cap 40, as is evident. The third or lowermost bracket 26 is now up and abutting the second bracket 18. The parts may be friction held in these positions and what with the tripod in use, a practical and convenient two-way lawn sprinkler is had.

The tripod legs may be removed and the device may be used for lawn flushing and washing purposes in the manner shown, for example, in Figure 2. Here, the nozzle 58 has been removed and a cap 52 has been replaced, but the hose is retained in position. The several brackets are spaced apart and the lower nozzle-equipped end of the tubing or pipe 32 is close to the ground. The pointed end of the stake or staff is forced into the ground and the device is moved from place to place with a stream of water moving in the manner shown in Figure 2 to remove leaves and debris D from the lawn surface E. When the device is used as a lawn washer, the position of the nozzle is almost touching the ground. In this position, it picks up leaves and grass and carries and floats them a considerable distance, as is well known. In an elevated position, the stream of water tends to drive the leaves and debris into the ground and does not carry them adequately. It will be evident, however, that this device is portable and the nozzle may be easily slid up and down on the stake. In fact, the device has to be raised to get into holes or in low places or on inclines. Being able to get the nozzle almost on the ground is one of the main features of the over-all multipurpose device. When a high pressure nozzle is used to wash a lawn, there is a lot of pressure pushing the nozzle back and it takes a strong man to hold it from going backwards when one has hold of it at the top and the nozzle is in the bottom position. In moving the whole outfit from place to place, merely raise the nozzle up as far as it will go while the stake is still in the ground and reach down and put a hand behind the nozzle and then lift the stake off the ground. The stake only has to be in the ground an inch or so to hold the pressure. The essence of novelty has to do with the stake in the ground to take up the pressure and in being able to raise and lower the nozzle, turn it from right to left, tip it up and down and tilt it from side to side, while the stake is still in the ground. One can hold the device with one finger on the top if the stake is in the ground, but it takes a strong man to hold it if it is not.

This device is also used for a third purpose, and that is for boring holes in the ground around the base of bushes, trees, plants and flowers. To this end, an extension or extra long nozzle tube 68 is provided, as shown in Figure 6, which tube has a coupling 70 which is connectable with the screw threaded end 38 when the closing cap 40 has been removed. As stated, this is used and may be raised and lowered by the adjustment means available to project a stream of water in a given spot and to start the hole, after which the nozzle or the lower end 38 is gradually forced down into the hole, using the water pressure to continue the boring operation. Once the hole is bored sufficiently deep, the nozzle is withdrawn and the device is removed, in an obvious manner. These holes are handily employed for filling with fertilizer in a practical and reliable manner.

What is claimed as new is as follows:

In combination, a vertically elongated staff having a pointed lower end which is adapted to be manually and forcibly pressed and thus temporarily staked at a given place in the user's lawn, said staff being of a length to facilitate handling and maneuvering the staff while standing as well as while walking from spot to spot during the act of washing debris from a lawn surface, a pipe complemental to said staff and adapted to conduct water under pressure therethrough, said pipe paralleling and being slidably mounted on said staff, a T-shaped coupling operatively mounted on the upper end of said pipe and having means whereby said T-coupling is thus adapted to accommodate a nozzle at one end of the T-coupling and a garden hose at the other end of said T-coupling, a second T-shaped coupling operatively mounted on the lower end of said pipe, an elongate hole boring nozzle connectible to said second T-coupling when its use is needed, and a high pressure nozzle connected to said second T-coupling and adapted, when it is optionally brought into use, to spray a stream of water in close proximity to the surface of a lawn.

References Cited in the file of this patent

UNITED STATES PATENTS

| | | |
|---|---|---|
| 973,810 | Regan | Oct. 25, 1910 |
| 1,102,736 | Grabau | July 7, 1914 |
| 1,327,428 | Gregory | Jan. 6, 1920 |
| 1,949,904 | Guedel | Mar. 6, 1934 |
| 1,959,886 | Wadsworth | May 22, 1934 |
| 2,621,968 | Vickroy | Dec. 16, 1952 |